Figure 1:
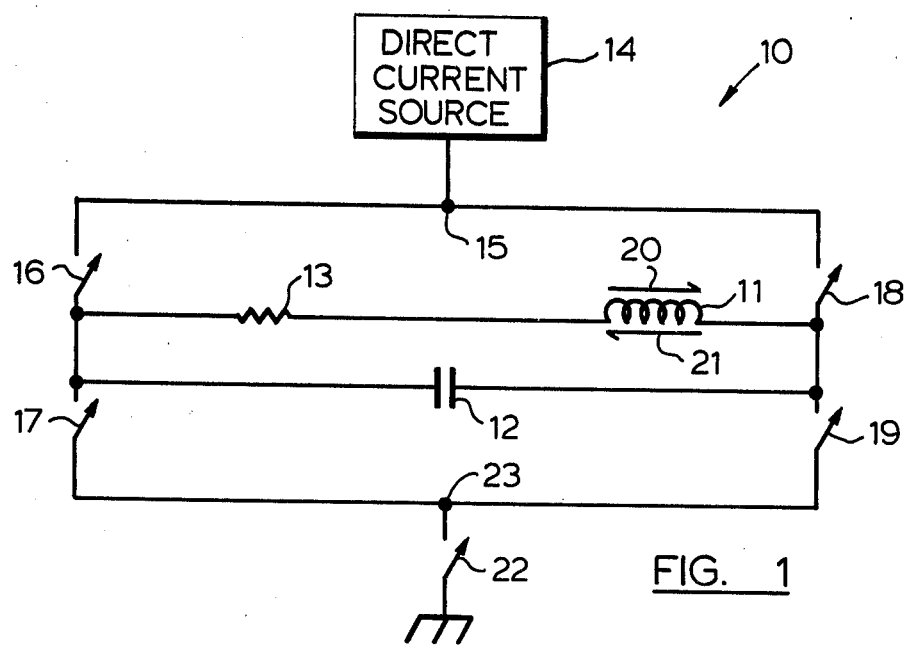

United States Patent [19]

Paul

[11] 4,157,579

[45] Jun. 5, 1979

[54] PULSE GENERATION EMPLOYING PARALLEL RESONANT LC CIRCUIT FOR ENERGIZING A COIL WITH SQUARE WAVE

[75] Inventor: Michael W. Paul, Mississauga, Canada

[73] Assignee: Barringer Research Limited, Rexdale, Canada

[21] Appl. No.: 864,060

[22] Filed: Dec. 23, 1977

[30] Foreign Application Priority Data

Jan. 4, 1978 [CA] Canada .................................. 269077

[51] Int. Cl.² ............................................. H01H 47/32
[52] U.S. Cl. ........................................ 361/152; 324/4; 361/156
[58] Field of Search ................... 361/152, 156; 328/60, 328/61, 63, 65, 67; 324/4–6

[56] References Cited

U.S. PATENT DOCUMENTS

| | | | |
|---|---|---|---|
| 3,317,744 | 5/1967 | Geleynse | 328/61 X |
| 3,400,304 | 9/1968 | Ziegler | 361/152 |
| 3,467,894 | 9/1969 | Blume | 361/156 |
| 3,736,589 | 5/1973 | Rambo | 328/61 X |
| 3,852,659 | 12/1974 | Barringer | 324/4 X |

Primary Examiner—Harry E. Moose, Jr.
Attorney, Agent, or Firm—Rogers, Bereskin & Parr

[57] ABSTRACT

A pulse generator for energizing a coil with periodic bipolar current pulses of predetermined aplitude, period and repetition rate and of generally square wave form. The coil to be energized is connected in parallel with a capacitor to form a closed under damped tuned circuit of predetermined frequency. Current flowing through the coil is suddenly interrupted, causing a sinusoidal voltage to be generated across the tuned circuit. The current flowing through the coil rapidly changes according to a cosine function. At a time when the current has reached its maximum positive or negative value or slightly before, controlled rectifiers in the circuit between the power source and the tuned circuit are caused to conduct thus maintaining the current in the coil at a level substantially equal to the maximum value. At the end of a predetermined interval, the supply of direct current to the tuned circuit again abruptly is interrupted, thus defining another edge of a pulse. The operation is repeated cyclically, and in this manner pulses of generally square wave form are generated periodically.

4 Claims, 10 Drawing Figures

PULSE GENERATION EMPLOYING PARALLEL RESONANT LC CIRCUIT FOR ENERGIZING A COIL WITH SQUARE WAVE

This invention relates to a pulse generator, and in particular to a pulse generator for energizing the coil or loop of an airborne electromagnetic prospecting system with high amplitude current pulses of generally square wave form.

U.S. Pat. No. RE28216 of Anthony R. Barringer discloses an airborne electromagnetic prospecting system wherein a transmitting coil is energized by high amplitude bipolar pulses of half sine wave shape. During intervals between the pulses when the transmitting coil is not being energized, secondary electromagnetic field transients emanating from the earth are received in a receiving coil. By analyzing the transients, the presence of ore bodies can be detected even in adverse circumstances, such as where the ore bodies are covered by conductive overburden, or when the surveys are carried out in rough air. This airborne electromagnetic prospecting system is very efficient and is currently in widespread use throughout the world. An improved transmitter or pulse generator which is used for energizing the transmitting coil in the aforesaid system is disclosed in U.S. Pat. No. 3,317,744 of Maarten Geleynse.

A disadvantage of the prior electromagnetic prospecting system referred to above is that a very large part of the secondary electromagnetic field is discarded since it is not possible in the prior system to analyze signals attributable to secondary fields occurring during the period of the transmitted pulses. As a result it is necessary to use a much higher power transmitter than typically is employed in other systems where the transmitter operates continuously, in order to compensate for the fact that most of the secondary field is discarded.

This disadvantage has been overcome in an improved electromagnetic prospecting system disclosed in U.S. Pat. No. 3,960,695 of Anthony R. Barringer. In the improved system, a primary electromagnetic field having a complex wave form is generated and is radiated toward the earth, for example from an aircraft. Interaction of the primary field and any buried conductors in the earth produces eddy currents which flow in the conductors and which in turn give rise to secondary electromagnetic fields which may be detected from the aircraft. A plurality of stored reference wave forms corresponding to known geological structures is matched against the received signals, and the optimum match is indicated. By this means, it is possible to conduct a rapid reconnaissance over an unknown area, and to obtain unusually rapid identification of any areas of potential mineralization, without the labourious and time consuming interpretation of electromagnetic data heretofore necessary. Moreover, it is possible to detect the secondary fields even during the presence of the primary field, thus providing a substantial advantage over the prior system.

An ideal wave form for broad band transient decay measurements is the square wave. However, until the present invention, no known pulse generator was considered entirely satisfactory for generating high amplitude current pulses into a transmitting coil of an airborne electromagnetic prospecting system with a desired frequency content.

According to the invention, the transmitting coil of the electromagnetic prospecting system is connected in parallel with a capacitor to form a closed oscillatory or tuned circuit of predetermined frequency. The frequency of the tuned circuit determines the wave form and frequency content of the leading and trailing edges of the pulses. The tuned circuit is connected to a source of direct current of predetermined voltage and current, and a plurality of controlled rectifiers are provided in the circuit whereby by causing appropriate ones of the controlled rectifiers to conduct, the current from the direct current source may be caused to flow in either direction through the coil. In addition, means such as a fast acting transistor switch controls the supply of direct current to the tuned circuit. When the switch is abruptly opened, the tuned circuit is disconnected from the supply of direct current, and a dynamic current flows through the coil, with a polarity determined by the direction of current flow. The shape of the dynamic current is that of a cosine. When the current has reached a maximum positive or negative value, depending upon the direction of the current flow, the tuned circuit is again connected to the source of direct current by activating appropriate ones of the controlled rectifiers, thus causing a steady current to flow through the coil, at a level corresponding to the maximum positive or maximum negative level of the dynamic current flowing immediately prior to the time when the tuned circuit was again energized by the source of direct current. After a predetermined time interval, during which a steady or direct current will continue to flow through the coil with constant amplitude, the direct current supply again abruptly is disconnected from the tuned circuit thus causing a dynamic current again to flow through the coil. The operation is repeated cyclically, and in this manner a repetition of periodic bipolar current pulses of generally square wave form and of predetermined amplitude, period and repetition rate are generated.

Figure 3A:
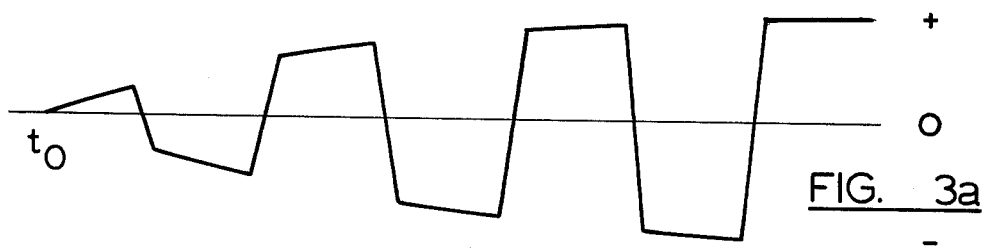
Figure 3B:
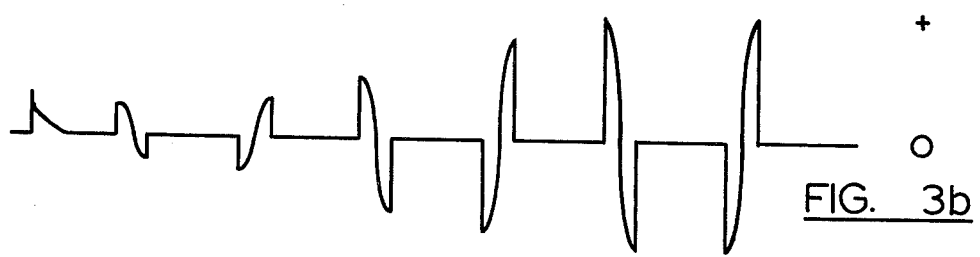
Figure 3C:
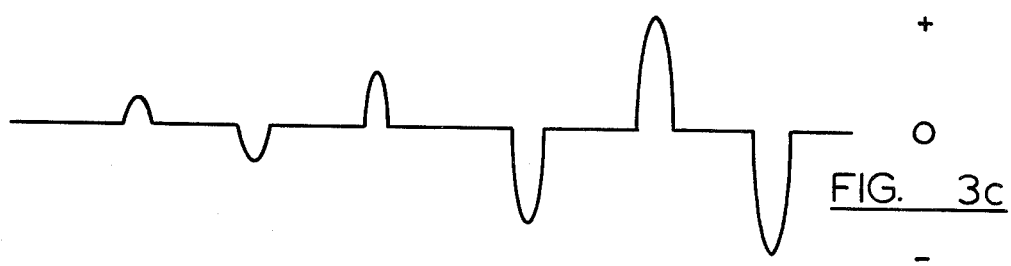
Figure 4:
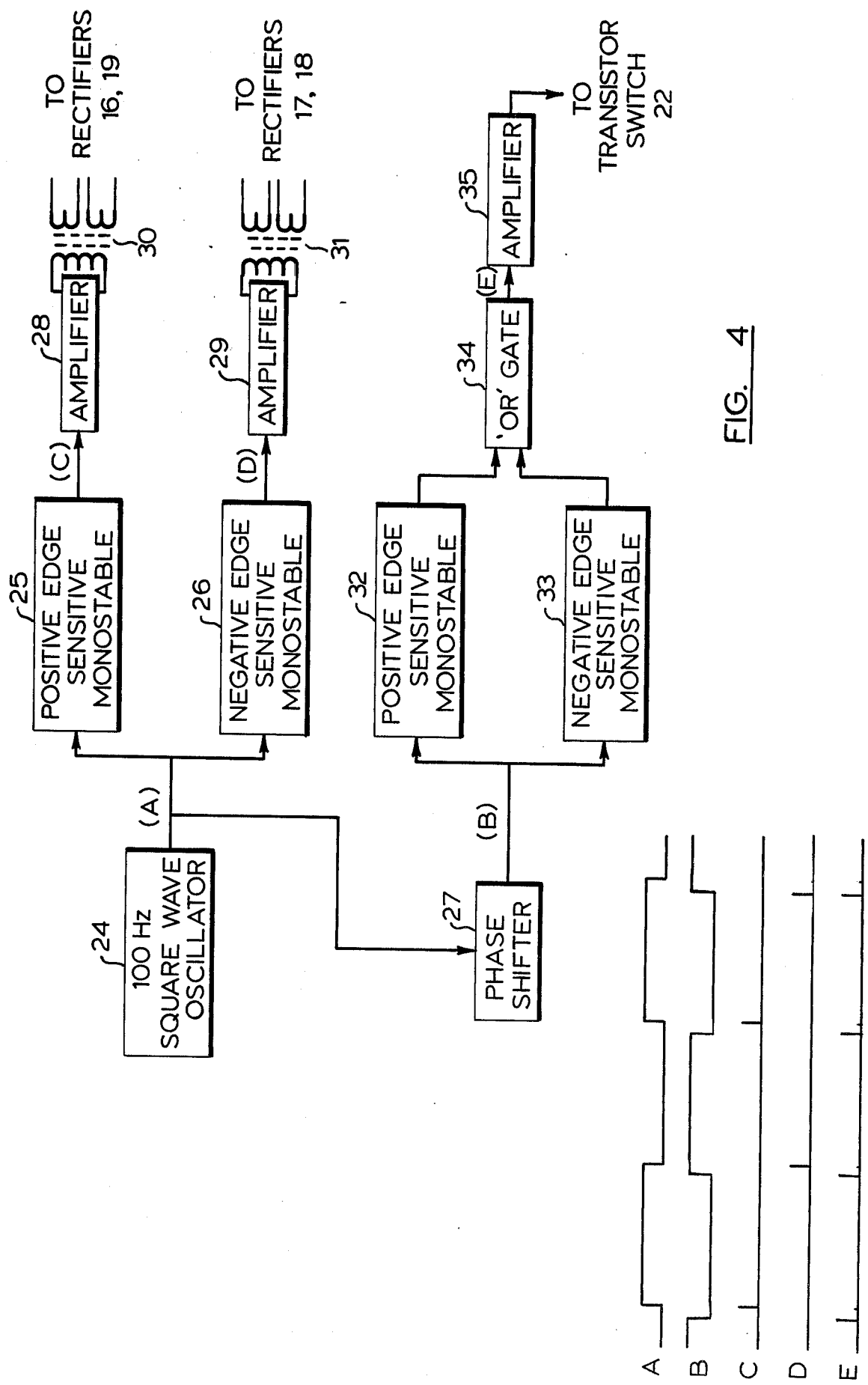

In the drawings,

FIG. 1 is a simplified schematic diagram of a preferred embodiment of the invention, FIGS. 2a–2e inclusive illustrate wave forms appearing at different point in the circuit of FIG. 1, FIGS. 3a–3c inclusive are illustrations of wave forms showing the manner in which pulses generated by the circuit of FIG. 1 build up exponentially towards an equilibrium value, from $t=0$, and FIG. 4 is a block diagram of a circuit used for controlling switches used in the circuit of FIG. 1.

Referring to the drawings, and in particular to FIG. 1, pulse generator 10 comprises a transmitting coil or loop 11 connected in parallel with a capacitor 12 to form a closed, under damped oscillatory or tuned circuit of predetermined frequency. Resistance 13 is shown as being connected in series between the coil 11 and the capacitor 12, but it will be understood that resistance 13 represents the direct current resistance of the tuned circuit (primarily consisting of the resistance of the coil 11) and is not a separate element. The tuned circuit comprising the coil 11 and the capacitor 12 is supplied with energy from a direct current source 14 which is connected to the circuit at point 15. Four silicon controlled rectifiers 16, 17, 18 and 19 are arranged to fire simultaneously in sets of two, rectifiers 16 and 17 constituting one set and rectifiers 17 and 18 constituting another set. Accordingly, when rectifiers 16 and 19 are in a conductive state, direct current from the direct current source 14 is caused to flow through the coil 11 in the direction of arrow 20 (the rectifiers 17 and 18 being nonconductive), and the direct current from the direct current source 14 flows in the direction of the arrow 21 through the coil 11 when the rectifiers 17 and 18 are conductive and the rectifiers 16 and 19 are nonconductive. For simplicity, the diagram of FIG. 1 does not show any gate electrodes in the silicon controlled rectifiers 16, 17, 18 and 19, but it will be understood that the activation of these rectifiers may be effected by supplying their respective gate electrodes with pulses of suitable amplitude, polarity and duration as will be discussed below.

It will be noted from examination of the circuit of FIG. 1 with reference to the above description, that current flowing through the coil 11 is returned to earth or ground via either one of the silicon controlled rectifiers 17 or 19, depending upon which one is in a conductive state. In addition, there is provided a transistor switch 22 which is connected between point 23 of the circuit and ground, so that when the transistor 22 is in a non-conductive state, current cannot flow from the direct current source 14 through the coil 11 to ground, and conversely when the transistor 22 is in its saturated or conductive state, current from the direct current source 14 is permitted to flow through the coil 11 to ground, in a direction which depends on which of the sets of silicon controlled rectifiers 16, 17, 18 and 19 are in a conducting state. The transistor 22 has been shown diagrammatically as consisting of a switch, but it will be understood that the transistor 22 comprises base, collector and emitter electrodes, the collector and emitter being connected between the point 23 and ground, and the base being supplied with pulses of predetermined amplitude and timing as will be discussed below. In addition, a plurality of transistors 22 may be connected in a Darlington configuration in order to increase the current carrying capacity of the transistor 22. Also, a resistor may be connected across the transistor 22, i.e. from point 23 to ground, in order to reduce the time constant of the collector circuit, thus reducing the voltage across the collector.

Figure 2A:
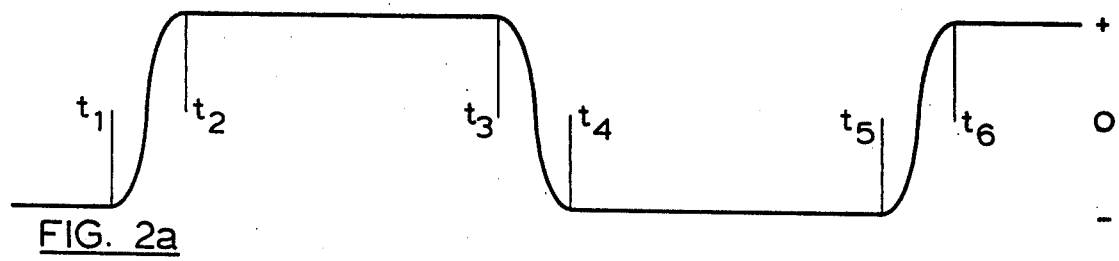
Figure 2B:
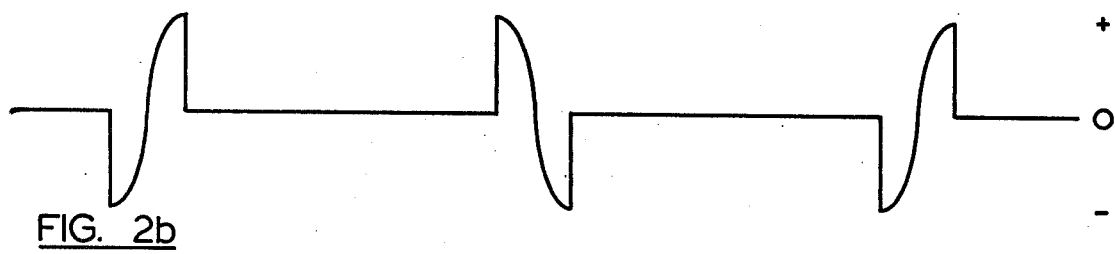
Figure 2C:
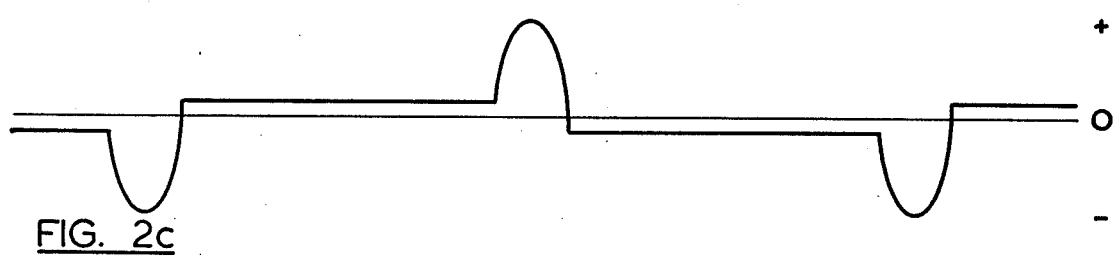

In operation, it will be assumed that the pulse generator 10 has been operating for a sufficient number of cycles so that current flowing through the coil 11 has reached an equilibrium. With reference to FIG. 2a, it will be assumed that silicon controlled rectifiers 17 and 18 and the transistor 22 are in their conducting states, so that current from the direct current source flows in the direction of the arrow 21 through the coil 11 and through the transistor 22 to ground. Immediately before time $t_1$ as shown in FIG. 2a, the current flowing through the coil 11 is a steady state current which, after a few cycles of operation, has reached a maximum amplitude, as will hereinafter be described in more detail. Also, immediately before time $t_1$, the controlled rectifiers 16 and 19 are off. At time $t_1$, the transistor switch 22 is abruptly opened. The sudden termination of the flow of direct current through the coil 11 causes a sinusoidal voltage to appear across the tuned circuit comprising the coil 11 and the capacitor 12. In the following description, reference will be made to several mathematical relationships in which:

$\omega = 2 \Pi F_N$
$F_N$ = Resonant Frequency
$V_{SAT}$ = SCR saturation voltage
$t_{OFF}$ = SCR turn-off time
$V_K$ = Transistor 22 saturation voltage
$V_{PMAX}$ = Maximum SCR voltage
$V_{CEMAX}$ = Maximum voltage across transistor
$V_{AA}$ = Supply voltage
$v_T$ = d.c. resistance of tuned circuit The voltage appearing across the tuned circuit has a wave form similar to that illustrated in FIG. 2c, and its maximum amplitude is $$V_{PMAX} = i_{LMAX}\left(\frac{L}{C}\right)^{\frac{1}{2}} \text{ where}$$

$$i_{LMAX} = \frac{V_{AA} - (2 V_{SAT} + V_K)}{v_T}$$

The sinusoidal voltage appearing across the tuned circuit commencing at time $t_1$ produces a cosine current in the coil 11 and it builds up to a maximum positive level from its maximum negative level between times $t_1$ and $t_2$ as shown in FIG. 2a. The current flowing through the coil 11 between times $t_1$ and $t_2$ (hereinafter referred to as "dynamic current") attains a value almost equal but not exactly equal to the amplitude of the current at time $t_1$. At time $t_2$, when the dynamic current has reached its maximum value, or slightly before time $t_2$, the controlled rectifiers 16 and 19 are caused to conduct. The transistor switch 22 had previously been turned on. Thus, when the controlled rectifiers 16 and 19 are turned on, considering that the transistor switch 22 is also on, current from the direct current source 14 with a value indicated in the formula above continues to flow through the coil 11 and is eventually returned to ground via the controlled rectifiers 16 and 19 and the transistor switch 22. During this period of time, i.e. between times $t_2$ and $t_3$ of FIG. 2a, the level of the current is substantially constant and is substantially at its maximum level after equilibrium conditions have been reached. The duration of the flow of dynamic current between times $t_1$ and $t_2$ is a function of the inductance of the coil 11 and the capacity of the capacitor 12. The transistor switch 22 is open only for a relatively small period of time determined by the turn off time of the silicon controlled rectifiers. The "off" period is very small in relation to the period between times $t_1$ and $t_2$.

The duration of the interval between times $t_1$ and $t_2$ during which the dynamic current flows is $$t_N = \frac{\pi}{W} \text{ where}$$

$$W = \frac{1}{(L \cdot C)^{\frac{1}{2}}}$$

During steady state conditions, i.e. between times $t_2$ and $t_3$, the voltage appearing across the tuned circuit is $$V_A = V_{AA} - (2V_{SAT} + V_K)$$

Similarly, at time $t_3$, the transistor switch 22 again is abruptly opened for a short duration, and dynamic current again is caused to flow through the coil 11, this time in the opposite direction, i.e. in the direction of the arrow 21. When the transistor switch 22 is opened, the silicon controlled rectifiers 16 and 19 cease conducting. Therefore, during each period when dynamic current is flowing through the coil 11, all of the silicon controlled rectifiers 16, 17, 18 and 19 are in a nonconducting state. The current continues to flow until it has reached its maximum negative value as shown in FIG. 2a, at which time or slightly before such time, pulses are applied to the gates of the silicon controlled rectifiers 17, 18 thereby causing them to conduct. During the period between t₄ and t₅, silicon controlled rectifiers 17, 18 and the transistor switch 22 are turned on, thus maintaining the current flowing through the coil 11 at its maximum negative steady state value as shown in FIG. 2a. The operation of the circuit continues in a cyclical manner. The current flowing through the capacitor 12 has a wave form as shown in FIG. 2b, and it is defined by the following relation:

$$i_C = i_{CMAX} \cos \omega t \text{ where}$$

$$i_{CMAX} = i_{LMAX}$$

Figure 2D:

The voltage appearing across the transistor 22 has a wave form similar to that shown in FIG. 2d, and its value is as follows:

$$V_{CEMAX} = V_{PMAX} \sin t_{OFF} \omega$$

Figure 2E:
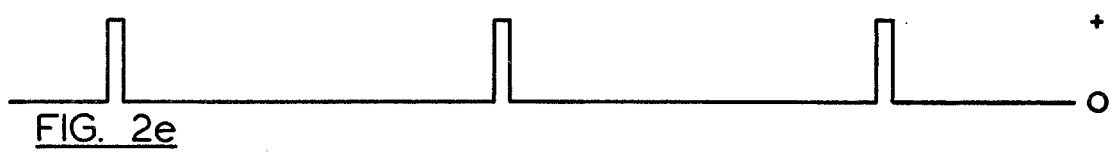

Gating pulses to be applied to the base of the transistor 22 have a wave form as shown in FIG. 2e. The duration of each such pulse is determined by the turnoff time of the silicon controlled rectifiers.

FIG. 3a illustrates the exponential rise of current flowing through the coil 11 from time $t_0$ when power is first applied to the circuit. In a similar manner, the current flowing through the capacitor 12 as shown in FIG. 3b as well as the voltage appearing across the tuned circuit will rise exponentially, as shown in FIG. 3c.

The resistance 13 represents the total direct current losses of the circuit, and its value, as well as the voltage of the direct current source 14 determines the maximum current that will flow through the coil 11.

It will be noted that the pulse width can easily be varied by varying the repetition rate of the pulses used for gating the silicon controlled rectifiers 16, 17, 18 and 19 and the transistor switch 22. Also, as indicated above, the duration of the period in which dynamic current is permitted to flow is determined by the resonant frequency of the tuned circuit, which depends on the inductance of the coil 11 and the capacity of the capacitor 12.

Referring to FIG. 4, there is shown a typical circuit for generating the gating pulses used for controlling the silicon controlled rectifiers 16, 17, 18 and 19 and the transistor switch 22. A square wave oscillator 24, typically operating at 100 Hz. generates a succession of square wave pulses which are fed to the inputs of a positive edge sensitive monostable 25, a negative edge sensitive monostable 26, and a phase shifter 27. Wave form A shown in FIG. 4 represents the wave form of the pulses produced by the square wave oscillator 24. The monostable 25 produces a repetition of narrow pulses coincident in time with the leading edges of the square wave produced by the oscillator 24, as shown in wave form C of FIG. 4. Similarly, the monostable 26 produces a repetition of narrow pulses coincident in time with the negative or trailing edges of the square wave pulses produced by the oscillator 24, as shown in wave form D of FIG. 4. The outputs of the monostables 25 and 26 respectively are fed to amplifiers 28 and 29, the outputs of which are respectively fed to rectifiers 16, 17 and rectifiers 17, 18 through pulse transformers 30 and 31, respectively. The phase shifter 27 produces a repetition of pulses similar in wave form to those produced by the square wave oscillator 24 but delayed somewhat in time, as shown in wave form B of FIG. 4. As will be described, the leading and trailing edges of the pulses produced by the phase shifter 27 are used to control the transistor switch 22, and consequently the period between the leading and trailing edges is equal to the time between times $t_1$ and $t_3$ and between times $t_3$ and $t_5$ as shown in FIG. 2a. In addition, the phase shift produced by the phase shifter 27 is such that the leading and trailing edges of the square waves appearing at the output of the phase shifter 27 occur at times $t_1$, $t_3$, $t_5$, etc. of FIG. 2a. The output of the phase shifter 27 is fed to the input of a positive edge sensitive monostable 32 and to the input of a negative edge sensitive monostable 33. The outputs of the monostables 32 and 33 respectively are fed to an 'OR' gate 34, which produces a pulse at its output whenever a pulse appears at either of its two inputs. The output of the 'OR' gate 34 consists of a repetition of pulses as shown in wave form E of FIG. 4, these pulses occurring at times corresponding to the respective leading and trailing edges of wave form B of FIG. 4. The output of the 'OR' gate 34 is fed to an amplifier 35, the output of which is connected to the base of transistor 22. It will be noted that the frequency of the pulses shown in wave form E of FIG. 4 is twice the frequency of the pulses shown in wave form C and D of FIG. 4. The pulses fed to the transistor switch 22 periodically turn off the transistor switch 22 for short durations corresponding to the width of the pulses of wave form E of FIG. 4, as previously described.

In the foregoing description, reference was made to the use of a transistor switch 22 for terminating the direct current flowing through the coil 11. As an alternative, the transistor switch 22 could be replaced with a pulse transformer, the secondary of which would be connected between point 23 of FIG. 1 and ground. The primary of the pulse transformer would be fed with pulses as shown in wave form E of FIG. 4, of such amplitude that the voltage appearing across the secondary of the pulse transformer and hence the voltage appearing across point 23 and ground of the circuit of FIG. 1 would be equal to or larger than the output voltage of the direct current source 14. This would result in momentarily reducing the current in the conductive ones of the silicon controlled rectifiers 16, 17, 18 and 19 below their latching current, thus rendering the rectifiers non-conductive. A disadvantage of this arrangement is that the pulse transformer would be fairly bulky.

In view of the fact that the tuned circuit comprising the coil 11 and the capacitor 12 will be of finite "Q", the dynamic current occurring between times $t_1$ and $t_2$, $t_3$ and $t_4$, etc. as shown in FIG. 2a will not quite reach the maximum equilibrium amplitude of the current. Thus, the edges of the pulses in the vicinity of times $t_2$, $t_4$, $t_6$, etc. will tend to droop somewhat and the resulting wave form will be somewhat distorted. In the event it is desired to reduce such distortion, the effective "Q" of the tuned circuit may be increased by the use of positive feedback injected into the circuit at the time when the wave form tends to droop. Such positive feedback could be derived by sampling the voltages which appear at each end of the coil 11, feeding such voltages to a differential amplifier, differentiating the output of the differential amplifier, and feeding back the resulting derivitive voltage to a transformer connected in series with the coil 11. The amplitude of the positive feedback voltage should be controllable so as to produce square waves having flat tops and bottoms. Instead of injecting the positive feedback through a transformer connected in series with the coil 11, the feedback voltage could be inductively coupled to the coil 11, for example by using a separate winding adjacent to the coil 11, thereby producing an air transformer.

In a typical design of a pulse generator for use in an airborne electromagnetic prospecting system the coil 11 had a radius of one meter and 54 turns. The capacitance of the capacitor 12 was about 40 mfd., yielding a resonant frequency of about 213 Hz. The inductance of the coil 11 was 14 mh. The voltage of the source 14 was 27 volts, and the maximum current was slightly less than 80 amp.

What I claim as my invention is:

1. A pulse generator for energizing a coil with periodic bipolar current pulses of predetermined amplitude, period and repetition rate and of generally square wave form, comprising:
   (a) a capacitor connected in parallel to the coil to form a closed oscillatory circuit of predetermined frequency,
   (b) controllable circuit means for electrically connecting and disconnecting said oscillatory circuit and a source of direct current of predetermined voltage and current, said circuit means including first controllable switch means for alternately reversing the direction of flow of current from said direct current source through said coil during successive current pulses, and second switch means for opening and closing said circuit means at predetermined intervals to thereby disconnect said coil from said direct current source, and
   (c) means for periodically activating said first controllable switch means at predetermined times, whereby upon abruptly opening said second switch means current flows in said coil in a first direction and upon activating said first controllable switch means, current from said source is caused to flow through said coil in a second direction which is opposite to said first direction, so that upon successive opening of said second switch means, leading and trailing edges of said pulses are thereby formed, and the current in said coil is kept at a substantially steady level between said leading and trailing edges.

2. A pulse generator as claimed in claim 1 wherein said second switch means is a transistor switch.

3. A pulse generator as claimed in claim 1 wherein said first controllable switch means comprises first and second pairs of controlled rectifiers, the controlled rectifiers of each pair being connected in series, said pairs of controlled rectifiers being connected in parallel and at one end to said direct current source and at the other end to said second switch means, and said oscillatory circuit being connected at one end between the controlled rectifiers of said first pair and at its opposite end to the controlled rectifiers of said second pair.

4. A pulse generator as claimed in claim 3 wherein said second switch means comprises a transistor having a base, a collector and an emitter, the collector and emitter being connected in said circuit means to control the flow of direct current in said circuit means whereby when said transistor is biased into a conducting state, said direct current source is connected through said transistor and through conductive ones of said controlled rectifiers to said coil.

* * * * *